US010425459B2

(12) United States Patent
Rider et al.

(10) Patent No.: US 10,425,459 B2
(45) Date of Patent: Sep. 24, 2019

(54) TECHNOLOGIES FOR A SEAMLESS DATA STREAMING EXPERIENCE

(71) Applicant: Intel Corporation, Santa Clara, CA (US)

(72) Inventors: Tomer Rider, Nahariyya (IL); Igor Tatourian, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 131 days.

(21) Appl. No.: 14/670,952

(22) Filed: Mar. 27, 2015

(65) Prior Publication Data

US 2016/0285938 A1    Sep. 29, 2016

(51) Int. Cl.
*H04L 29/06* (2006.01)
*H04L 29/08* (2006.01)

(52) U.S. Cl.
CPC ............ *H04L 65/602* (2013.01); *H04L 67/18* (2013.01); *H04L 67/24* (2013.01)

(58) Field of Classification Search
CPC .......... H04L 65/60; H04L 67/10; H04L 29/06
USPC ........................................................ 709/217
See application file for complete search history.

(56) References Cited

U.S. PATENT DOCUMENTS

| | | | | |
|---|---|---|---|---|
| 6,445,679 | B1* | 9/2002 | Taniguchi | ............... H04L 29/06 370/232 |
| 9,037,354 | B2* | 5/2015 | Mondragon | ............ G09G 5/00 701/48 |
| 9,554,229 | B2* | 1/2017 | Ek | ........................... G06F 3/011 |
| 2002/0134220 | A1* | 9/2002 | Yamane | ............... G11B 27/034 84/609 |
| 2007/0153740 | A1* | 7/2007 | Chang | .............. H04L 29/06027 370/331 |

(Continued)

FOREIGN PATENT DOCUMENTS

| | | |
|---|---|---|
| EP | 3146445 | 3/2017 |
| KR | 10-2010-0137327 | 12/2010 |
| WO | 2016/043976 | 3/2016 |

OTHER PUBLICATIONS

International Search Report for PCT/US16/019796, dated Jun. 8, 2016 (3 pages).

(Continued)

*Primary Examiner* — Moustafa M Meky
*Assistant Examiner* — Elizabeth Kassa
(74) *Attorney, Agent, or Firm* — Barnes & Thornburg LLP

(57) ABSTRACT

Technologies for seamless data streaming include a control server and one or more client computing devices. A client computing device receives user presence data indicative of whether a user is nearby from one or more sensors. The client computing device may receive user interest data indicative of the user's interest level in the current data stream from one or more sensors. The control server identifies available client computing devices based on the user presence data, selects a target client computing device, and causes the data stream to transition from the current client computing device to the target client computing device. The target client computing device may be selected based on proximity of the user or the user's interest level in the data stream. The volume or balance of the data stream may be adjusted to provide a smooth transition between client computing devices. Other embodiments are described and claimed.

8 Claims, 5 Drawing Sheets

(56) References Cited

U.S. PATENT DOCUMENTS

| | | | |
|---|---|---|---|
| 2008/0081558 A1* | 4/2008 | Dunko | G11B 27/002 455/41.1 |
| 2008/0285542 A1 | 11/2008 | Jachner | |
| 2009/0055537 A1 | 2/2009 | Takei et al. | |
| 2010/0042235 A1* | 2/2010 | Basso | H04N 21/2389 700/94 |
| 2010/0278345 A1* | 11/2010 | Alsina | H04L 63/0492 380/283 |
| 2011/0065376 A1* | 3/2011 | Forutanpour | H04W 4/185 455/3.01 |
| 2011/0083111 A1* | 4/2011 | Forutanpour | G06F 1/1694 715/863 |
| 2013/0125171 A1 | 5/2013 | Sharif-Ahmadi | |
| 2013/0290494 A1 | 10/2013 | Goudarzi et al. | |
| 2013/0304789 A1 | 11/2013 | Herlein | |
| 2014/0006129 A1* | 1/2014 | Heath | G06Q 30/0222 705/14.23 |
| 2014/0368734 A1* | 12/2014 | Hoffert | H04N 5/44591 348/564 |
| 2015/0019714 A1* | 1/2015 | Shaashua | H04L 67/24 709/224 |
| 2015/0089075 A1* | 3/2015 | Strigeus | G06F 16/2228 709/231 |
| 2015/0154445 A1* | 6/2015 | Biswas | G06K 9/00604 345/2.3 |
| 2015/0161360 A1* | 6/2015 | Paruchuri | G06F 21/10 726/27 |
| 2015/0234939 A1* | 8/2015 | Aharony | G06F 17/3087 707/737 |
| 2015/0277683 A1* | 10/2015 | Eteminan | G06F 3/0484 715/745 |
| 2016/0014061 A1* | 1/2016 | Cholkar | H04L 51/10 709/206 |
| 2016/0077710 A1* | 3/2016 | Lewis | G06F 3/04842 715/716 |
| 2017/0048613 A1* | 2/2017 | Smus | H04M 1/7253 |

OTHER PUBLICATIONS

Written Opinion for PCT/US16/019796, dated Jun. 8, 2016 (9 pages).

Extended European Search Report for European Patent Application No. EP16773677 dated Jul. 26, 2018 (12 pages).

* cited by examiner

TECHNOLOGIES FOR A SEAMLESS DATA STREAMING EXPERIENCE

BACKGROUND

As computing devices have become smaller and more capable, users typically interact with many different devices in different physical locations and contexts. Among other applications, typical computing devices may support cloud-based data streaming. For example, a user's computer, smartphone, home entertainment system, and/or in-vehicle infotainment system may support streaming data such as video, audio, audiobooks, games, or other media from one or more network data sources. A user may begin streaming data by, for example, initiating a data streaming application and selecting a data stream on each device. Each device may continue to stream data until receiving a command from the user, such as a command to stop streaming data or to deactivate the device. Certain advanced audio receivers may allow the user to manually select between multiple audio zones for output. Similarly, some smart home media devices may activate music once a user is detected, but do not have the capability to transfer music from another device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
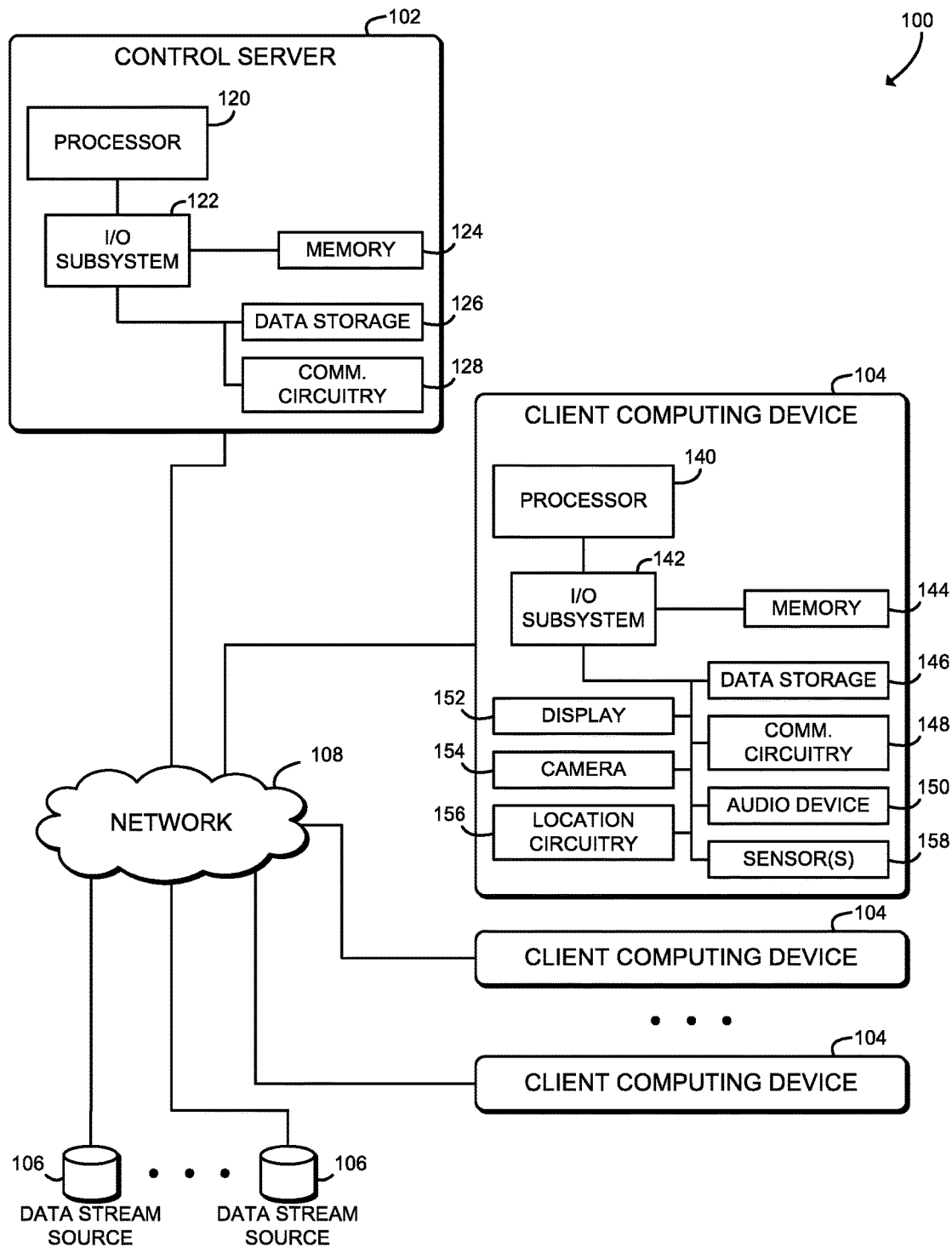
FIG. 1 is a simplified block diagram of at least one embodiment of a system for a seamless data streaming experience.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for a seamless data streaming experience includes a control server 102, several client computing devices 104, and several data stream sources 106 in communication over a network 108. In use, as described in more detail below, a user may stream data, such as an audio stream, from a data stream source 106 to a client computing device 104. The client computing devices 104 may monitor sensor data to determine if they are nearby the user. The control server 102 may identify those client computing devices 104 that are nearby the user and active. The control server 102 may coordinate transferring an active data stream from one client computing device 104 to another client computing device 104, for example when the user moves to a new location and becomes nearby a new client computing device 104. The control server 102 and/or the client computing devices 104 may adjust parameters of the data stream such as volume or balance to create a smooth transition between the client computing devices 104. Thus, the system 100 may provide for a seamless data streaming experience between multiple devices, without requiring the user to identify, remember, and/or manually select the data stream on multiple devices.

Additionally, although illustrated as including a separate control server 102 and client computing devices 104, it should be understood that in some embodiments some or all of those functions may be performed by a single device. For example, in some embodiments the user's smartphone may perform the functions of both the control server 102 and a client computing device 104 by controlling other client computing devices 104 and by streaming data when appropriate.

The control server 102 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, an in-vehicle infotainment (IVI) device, a distributed computing system, a processor-based system, and/or a consumer electronic device. As shown in FIG. 1, the control server 102 illustratively includes a processor 120, an input/output subsystem 122, a memory 124, a data storage device 126, and communication circuitry 128. Of course, the control server 102 may include other or additional components, such as those commonly found in a server (e.g., various input/output devices), in other embodiments. Additionally, in some embodiments, one or more of the illustrative components may be incorporated in, or otherwise form a portion of, another component. For example, the memory 124, or portions thereof, may be incorporated in one or more processors 120 in some embodiments. Additionally, in some embodiments, the control server 102 may be embodied as a "virtual server" formed from multiple computing devices distributed across the network 108 and operating in a public or private cloud. Accordingly, although the control server 102 is illustrated in FIG. 1 as embodied as a single server computing device, it should be appreciated that the control server 102 may be embodied as multiple devices cooperating together to facilitate the functionality described below.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the control server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the control server 102. For example, the I/O subsystem 122 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the control server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the control server 102 may be embodied as any communication circuit, device, or collection thereof, capable of enabling communications between the control server 102, the client computing devices 104, the data stream sources 106, and/or other remote devices over the network 108. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each of the client computing devices 104 may be embodied as any type of computation or computer device capable of performing the functions described herein, including, without limitation, a smartphone, a mobile audio or video player, a computer, a desktop computer, a workstation, a laptop computer, a notebook computer, a tablet computer, a mobile computing device, a wearable computing device, a network appliance, a web appliance, an in-vehicle infotainment (IVI) device, a distributed computing system, a processor-based system, and/or a consumer electronic device. The client computing device 104 may include components and devices commonly found in a smartphone or similar computing device, such as a processor 140, an I/O subsystem 142, a memory 144, a data storage device 146, communication circuitry 148, and/or other peripheral devices. Those individual components of the client computing device 104 may be similar to the corresponding components of the control server 102, the description of which is applicable to the corresponding components of the client computing device 104 and is not repeated herein so as not to obscure the present disclosure.

Each client computing device 104 may also include an audio device 150, a display 152, a camera 154, location circuitry 156, and/or additional sensors 158. The audio device 150 may be embodied as any device capable of generating audio signals for output, such as a paper cone speaker, an audio transducer, an audio output jack, a digital-to-analog converter (DAC), or other type of audio device. The client computing device 104 may use the audio device 150 to output an audio data stream such as music, audiobooks, or other content. Similarly, the display 152 may be embodied as any type of display capable of displaying digital information such as a liquid crystal display (LCD), a light emitting diode (LED), a plasma display, a cathode ray tube (CRT), or other type of display device.

The camera 154 may be embodied as a digital camera or other digital imaging device integrated with the client computing device 104 or otherwise communicatively coupled thereto. The camera 154 includes an electronic image sensor, such as an active-pixel sensor (APS), e.g., a complementary metal-oxide-semiconductor (CMOS) sensor, or a charge-coupled device (CCD). The camera 154 may be used to capture images of the environment and/or user of the client computing device 104 including, in some embodiments, capturing still images or video images.

The location circuitry 156 of the client computing device 104 may be embodied as any type of circuit capable of determining the precise or approximate position of the client computing device 104. For example, the location circuitry 156 may be embodied as a global positioning system (GPS) receiver, capable of determining the precise coordinates of the client computing device 104. In other embodiments, the location circuitry 156 may triangulate or trilaterate the position of the client computing device 104 using distances or angles to cellular network towers with known positions, provided by the communication circuitry 128. In other embodiments, the location circuitry 156 may determine the approximate position of the client computing device 104 based on association to wireless networks with known positions, using the communication circuitry 128.

The client computing device 104 also includes a number of sensors 158 to detect features of the environment and/or the user. The sensors 158 may include, for example, an audio sensor, one or more motion sensor(s), a proximity sensor, and/or a biometric sensor such as a skin conductance sensor. The audio sensor may be embodied as any sensor capable of capturing audio signals, such as a microphone, a line input jack and associated circuitry, an analog-to-digital converter (ADC), or other type of audio sensor. The motion sensor(s) may be embodied as one or more of any sensor capable of sensing motion of the client computing device 104 including, for example, one or more accelerometers, gyroscopes, compasses, or any other type of device or devices capable of detecting device motion. The proximity sensor may be embodied as any sensor capable of determining whether the user or another object is nearby the client computing device 104 including, for example, a micropower impulse radar, an electric field sensor, a vibration sensor, a Doppler shift sensor, a scanning rangefinder, or any other type of device or devices capable of sensing proximity. The biometric sensor may include any sensor that measures a physiological attribute of the user of the client computing device 104. For example, a skin conductance sensor, also known as an electrodermal sensor or a galvanic skin response (GSR) sensor, may be embodied as a sensor that, when placed in contact with the user's skin, measures the electrical conductance of the skin. Electrical conductance of the skin varies with the skin's moisture level, and thus may indicate activity of the sweat glands, which in turn may indicate the user's arousal state or otherwise indicate the existence of a physiological or psychological condition. Of course, the client computing device 104 may include additional or other sensors 158 in other embodiments.

Each of the data stream sources 106 may be embodied as a server device, storage device, cloud service, or other distributed data source that may stream data over the network 108 to the client computing device 104. For example, each data stream source 106 may be embodied as a streaming music service or other streaming media service. In some embodiments, one or more of the data stream sources 106 may be incorporated in the control server 102, a client computing device 104, or other component of the system 100.

As discussed in more detail below, the control server 102, the client computing device 104, and the data stream sources 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 2:
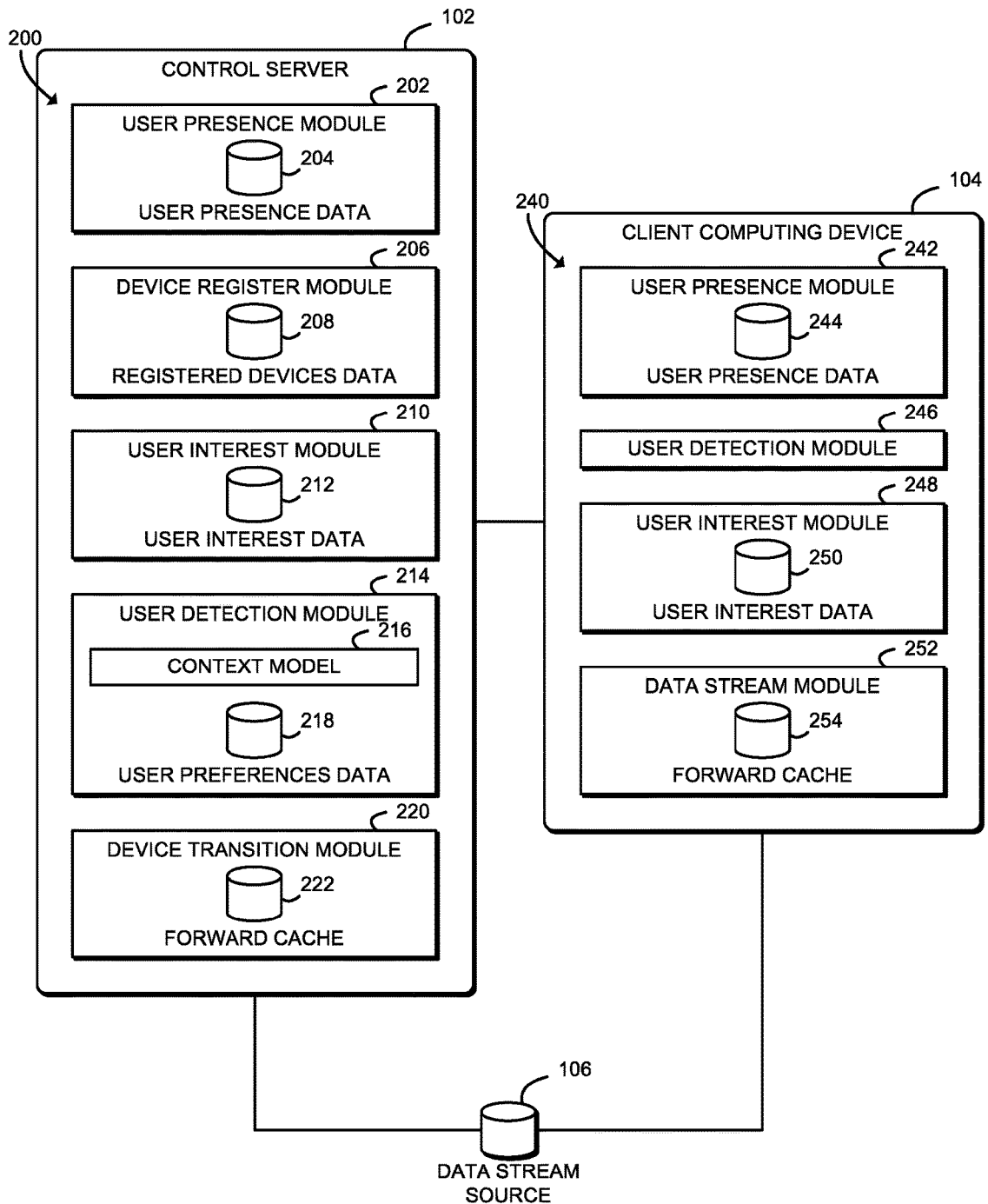
FIG. 2 is a simplified block diagram of at least one embodiment of various environments that may be established by the system of FIG. 1.

Referring now to FIG. 2, in an illustrative embodiment, the control server 102 establishes an environment 200 during operation. The illustrative environment 200 includes a user presence module 202, a device register module 206, a user interest module 210, a user detection module 214, and a device transition module 220. The various modules of the environment 200 may be embodied as hardware, firmware, software, or a combination thereof. For example the various modules, logic, and other components of the environment 200 may form a portion of, or otherwise be established by, the processor 120 or other hardware components of the control server 102. As such, in some embodiments, any one or more of the modules of the environment 200 may be embodied as a circuit or collection of electrical devices (e.g., a user presence circuit, a device register circuit, etc.).

The user presence module 202 is configured to receive user presence data 204 from one or more remote client computing devices 104. The user presence data 204 is indicative of whether a user is nearby each of the corresponding client computing devices 104. The user presence data 204 may include, for example, sensor data received from the client computing devices 104.

The device register module 206 is configured to identify one or more available client computing devices 104 based on the user presence data 204. The device register module 206 may identify the client computing devices 104 as available if a user is nearby each of the available client computing devices 104, and if the available client computing devices 104 is active or otherwise capable of being used by the system 100. The device register module 206 may maintain registered devices data 208, which may identify the client computing devices 104 registered with the system 100.

The user interest module 210 is configured to receive user interest data 212 from one or more client computing devices 104. The user interest data 212 is indicative of an interest level of the user in the data stream currently being streamed by the corresponding client computing device 104. The user interest data 212 may include, for example, sensor data received from the client computing devices 104. The user interest module 210 is further configured to determine a user interest level as a function of the user interest data 212.

The user detection module 214 is configured to identify one or more users of the client computing devices 104 based on the user presence data 204. Each of the identified users is nearby a corresponding available client computing device 104. Each of the identified users may be associated with a user profile or other user-specific data stored in the user preferences data 218. The user detection module 214 may be further configured to identify a primary user based on a context model 216. The context model 216 may, for example, model or predict social relationships between identified users. The user detection module 214 may be configured to update the context model 216 based on the user interest level determined based on the user interest data 212.

The device transition module 220 is configured to select a target client computing device 104 from the available client computing devices 104 and cause a data stream to transition from its current client computing device 104 to the target client computing device 104. The device transition module 220 may be configured to select the target client computing device 104 based on, for example, proximity of the target client computing device 104 to the user, the user interest level, the user preferences data 218, or on other parameters. The device transition module 220 may be further configured to adjust a data stream playback parameter such as volume or balance to create a smooth transition from the current client computing device 104 to the target client computing device 104. The device transition module 220 may be configured to cache the contents of the data stream in a forward cache 222 for use by the target client computing device 104.

Still referring to FIG. 2, in the illustrative embodiment, a client computing device 104 establishes an environment 240 during operation. The illustrative environment 240 includes a user presence module 242, a user detection module 246, a user interest module 248, and a data stream module 252. The various modules of the environment 240 may be embodied as hardware, firmware, software, or a combination thereof.

For example the various modules, logic, and other components of the environment 240 may form a portion of, or otherwise be established by, the processor 140 or other hardware components of the client computing device 104. As such, in some embodiments, any one or more of the modules of the environment 240 may be embodied as a circuit or collection of electrical devices (e.g., a user presence circuit, a user detection circuit, etc.).

The user presence module 242 is configured to receive user presence data 244 from one or more sensors of the client computing device 104. The user presence data 244 is indicative of whether a user is nearby the client computing device 104. The user presence module 242 is further configured to transmit the user presence data 244 to the control server 102. The user presence module 242 may be further configured to determine whether the user is nearby the client computing device 104 based on the user presence data 244.

The user detection module 246 is configured to identify one or more users based on the user presence data 244. Each of the identified users is nearby the client computing device 104. The user detection module 246 may be configured to transmit identification information related to the identified users to the control server 102.

The user interest module 248 is configured to receive user interest data 250 from one or more sensors of the client computing device 104. The user interest data 250 is indicative of an interest level of the user in the current data stream being output by the client computing device 104. The user interest module 248 is configured to transmit the user interest data 250 to the control server 102. The user interest module 248 may be configured to determine a user interest level based on the user interest data 250.

The data stream module 252 is configured to receive a data stream such as an audio stream from a data stream source 106. The data stream module 252 may be configured to adjust a parameter of the data stream, such as volume or balance, based on a location of the user relative to the client computing device 104. The data stream module 252 may be configured to receive a command to transition the data stream to or from another client computing device 104 and to transition the data stream in response to receiving the command. The data stream module 252 may be configured to maintain a forward cache 254 to cache the contents of the data stream. In some embodiments the data stream module 252 may be configured to transfer the forward cache 254 to or from another client computing device 104.

Figure 3A:
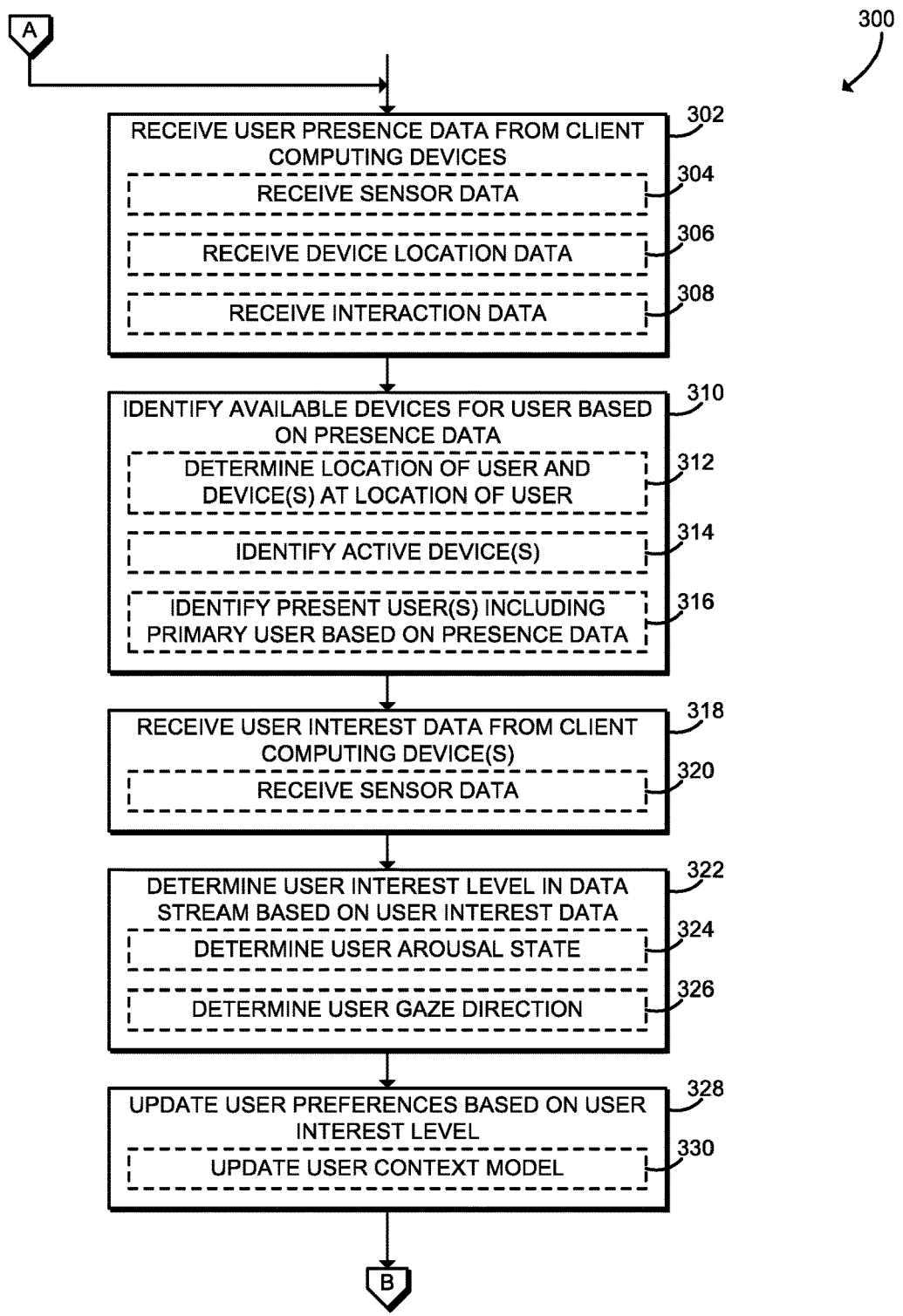
FIGS. 3A and 3B are a simplified flow diagram of at least one embodiment of a method for seamless data streaming that may be executed by a control server of the system of FIGS. 1 and 2.
Figure 3B:
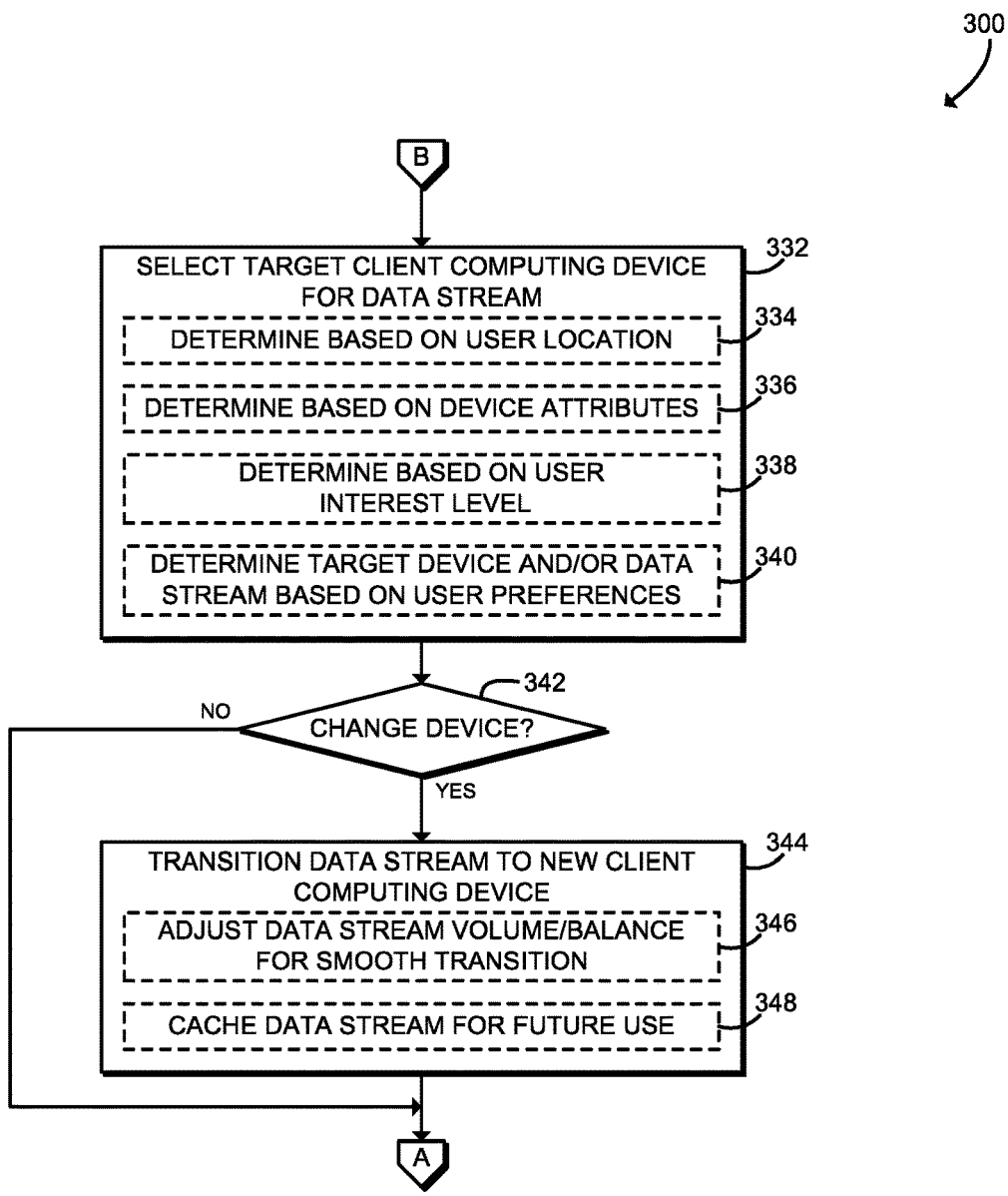

Referring now to FIGS. 3A and 3B, in use, the control server 102 may execute a method 300 for seamless data streaming. The method 300 begins with block 302, in which the control server 102 receives user presence data 204 from one or more of the client computing devices 104. The user presence data 204 indicates whether a user is present and capable of engaging with a data stream output produced by the corresponding client computing devices 104. For example, the user presence data 204 may indicate whether the user is nearby the client computing device 104 and thus capable of hearing an audio data stream output by the audio device 150 of the corresponding client computing device 104. The user presence data 204 may be embodied as any combination of raw data that may be interpreted by the control server 102 or higher-level data indicating that the user is present.

In some embodiments, in block 304, the control server 102 may receive sensor data from the client computing devices 104. For example, the control server 102 may receive data from the camera 154 and may detect the presence of the user by analyzing image data produced by the camera 154. The control server 102 may, for example, perform a facial recognition algorithm or other operation on the image data to detect the presence of the user. As another example, the control server 102 may receive sensor data from other sensors 158 of the client computing device 104 such as a proximity sensor or a biometric sensor. In some embodiments, in block 306 the control server 102 may receive location data from the location circuitry 156 of the client computing device 104. For a client computing device 104 such as a mobile computing device or a wearable computing device that is commonly used near the user, the location of the client computing device 104 may correspond to the location of the user. In some embodiments, in block 308 the control server 102 may receive interaction data from the client computing device 104. The interaction data may be embodied as user interface commands, data streaming commands, or other events indicating that the user is interacting with the client computing device 104 and is thus present at the client computing device 104. In some embodiments, the control server 102 may receive the interaction data indirectly, for example by receiving data stream metadata from one or more of the data stream sources 106 indicating that the user has started and/or stopped streaming data to a particular client computing device 104.

In block 310, the control server 102 identifies available client computing devices 104 for the user based on the user presence data 204. The user is capable of engaging with a data stream output produced by each of the corresponding available client computing devices 104. For example, the user may be nearby each of the available client computing devices 104 and thus may be capable of hearing audio output by the audio device 150 of each of the available client computing devices 104. The control server 102 may identify the available client computing devices 104 by selecting from client computing devices 104 that have previously been registered with the control server 102, based on the registered devices data 208. The control server 102 may use any technique to identify the available client computing devices 104. In some embodiments, in block 312, the control server 102 determines the location of the user and the available client computing devices 104 at that location. For example, the control server 102 may determine that the user is in a particular room in the user's house based on presence data received from the client computing devices 104 such as location data received from a mobile computing device or sensor data placing the user in the room. The control server 102 may then determine the client computing devices 104 also located in that room (e.g., a stereo system, a television, a computer, and/or other client computing devices 104). In some embodiments, in block 314, the control server 102 may limit the available client computing devices 104 to those client computing devices 104 that are currently active (e.g., turned on or otherwise enabled).

In block 316, the control server 102 may identify the user or users present at each of the client computing device 104 based on the user presence data 204. The control server 102 may also identify a primary user if more than one user is identified for a client computing device 104. For example, the control server 102 may analyze available biometric information to identify the users present nearby each client computing device 104. The control server 102 may identify the primary user by predicting relationships between users using the context model 216. For example, control server 102 may identify the primary user based on age, gender, or observed behaviors of the users in a group setting. As described below, the control server 102 may update the context model 216 based on observed behaviors, for example using one or more machine learning algorithms.

In block 318, the control server 102 receives user interest data 212 from one or more of the client computing devices 104. The user interest data 212 indicates the user's level of interest in the data stream output of the corresponding client computing device 104. For example, the user interest data 212 may indicate whether the user is interested in the song currently being streamed by a client computing device 104. The user interest data 212 may be embodied as any combination of raw data that may be interpreted by the control server 102 or higher-level data indicating the user's interest level. In some embodiments, in block 320 the control server 102 may receive sensor data from the client computing device 104. For example, the control server 102 may receive image data from the camera 154 and/or sensor data from one or more of the sensors 158, such as a skin conductance sensor or a motion sensor.

In block 322, the control server 102 determines the user's interest level in the data stream by analyzing the user interest data 212 received from the client computing devices 104. In some embodiments, in block 324 the control server 102 may determine the user's interest level by determining the user's arousal state. The user's arousal state may indicate interest in the current data stream. The control server 102 may, for example, examine image data for indications of the user's emotional state, such as the user's facial expression, motions, or heart rate. As another example, the control server 102 may determine the arousal state by analyzing skin conductance sensor data for anomalous signals indicating a change in nervous signaling. Changes in the skin conductance response may indicate the user's arousal state and thus the user's interest in the data stream.

In some embodiments, in block 326 the control server 102 may determine the user's gaze direction, which may indicate the user's interest in the data stream. For example, if interested in the data stream the user may look at the display 152 of the client computing device 104 in order to read information about the data stream such as title and/or artist information. The control server 102 may determine the gaze direction by examining image data received from the camera 154. Similarly, the control server 102 may determine that the user is viewing the display 152 of the client computing device 104 based on motion sensor data, for example by determining that the user has raised the client computing device 104 into viewing position.

In block 328, the control server 102 updates the user preferences data 218 based on the user interest level. For example, the control server 102 may record the interest level and the associated data stream, allowing a profile of the user's media preferences to be learned over time. If multiple users are present, control server 102 may update the user preferences data 218 associated with the primary user. In some embodiments, in block 330 the control server 102 may update the user context model 216 based on the user interest level. For example, based on the user preference level, the control server 102 may determine whether or not the primary user was correctly selected and then update the relationships between users accordingly. As another example, the control server 102 may update the relationships between users based on whether a user overrides the system 100.

In block 332, shown in FIG. 3B, the control server 102 selects a target client computing device 104 for the data stream from the available client computing devices 104. The control server 102 may select the target client computing device 104 based on any combination of the user's location, pattern of activities, user preferences, and/or other relevant information. In some embodiments, in block 334 the control server 102 may determine the target client computing device 104 based on the user's location. For example, the control server 102 may select the available client computing device 104 that is closest to the user's current location.

In some embodiments, in block 336 the control server 102 may determine the target client computing device 104 based on one or more device attributes. For example, the control server 102 may select a client computing device 104 based on the characteristics of its audio device 150 (e.g., selecting an audiovisual receiver instead of a smartphone when the user is nearby both devices).

In some embodiments, in block 338 the control server 102 may determine the target client computing device 104 based on the user interest level. For example, the control server 102 may select a target client computing device 104 only when the user is interested in the data stream (e.g., if the user interest level is above a predefined threshold). Continuing that example, if the user is not interested in the data stream, the control server 102 may determine that no target client computing device 104 is appropriate and thus the data stream may not follow the user to a new location or new context.

In some embodiments, in block 340 the control sever 102 may determine the target client computing device 104 and/or determine the data stream based on one or more user preferences. For example, the user preference may identify a preferred client computing device 104. As another example, the control server 102 may select a data stream based on recorded user interest level data associated with the user. When multiple users have been identified, the control server 102 may select a data stream preferred by the primary user, as recorded in the user preferences data 218.

In block 342, the control server 102 determines whether to change the client computing device 104 that is currently outputting the data stream. For example, the control server 102 may determine whether the target client computing device 104 determined above in connection with block 332 is different from the client computing device 104 currently outputting the data stream. If the control server 102 determines not to change the client computing device 104, the method 300 loops back to block 302, shown in FIG. 3A, to continue monitoring the user presence data 204. If the control server 102 determines to change the client computing device 104, the method 300 advances to block 344.

In block 344, the control server 102 causes the data stream to transition from the current client computing device 104 to the target client computing device 104 determined as described above in block 332. The control server 102 may use any appropriate technique for transitioning the data stream. For example, the control server 102 may send one or more commands or other control messages to one or more client computing devices 104 and/or data stream sources 106. In some embodiments, the control server 102 may directly forward the data stream to the target client computing device 104. In some embodiments, in block 346, the control server 102 may adjust the data stream audio volume and/or balance to smoothly transition between the client computing devices 104. For example, the control server 102 may adjust the volume to compensate for differences in the distance between the user and the client computing devices 104, differences between output level of the audio devices 150, and/or other factors affecting the user's perception of the data stream output.

In some embodiments, in block 348 the control server 102 may cache the data stream in the forward cache 222 and/or other storage location. Caching the data stream may allow the user to seamlessly continue with the data stream from the target client computing device 104 even if the data stream cannot be immediately transitioned between client computing devices 104. After transitioning the data stream, the method 300 loops back to block 302, shown in FIG. 3A, to continue monitoring the user presence data 204.

Figure 4:
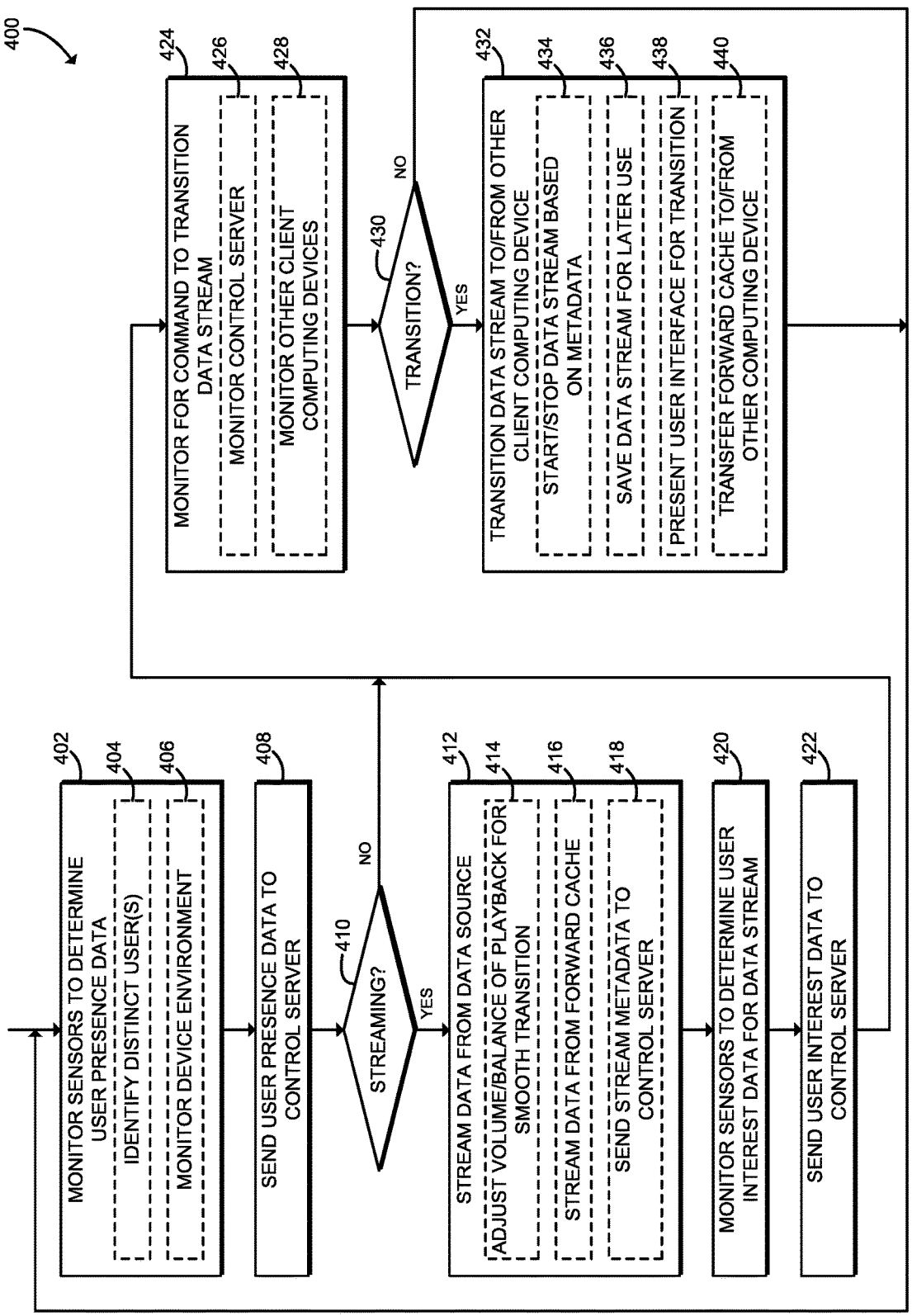
FIG. 4 is a simplified flow diagram of at least one embodiment of a method for seamless data streaming that may be executed by a computing device of the system of FIGS. 1 and 2.

Referring now to FIG. 4, in use, a client computing device 104 may execute a method 400 for seamless data streaming. The method 400 begins with block 402, in which the client computing device 104 monitors one or more sensors to determine the user presence data 244. The user presence data 244 indicates whether a user is present and capable of engaging with a data stream output produced by the client computing device 104. For example, the user presence data 244 may indicate whether the user is nearby the client computing device 104 and thus capable of hearing an audio data stream output by the audio device 150. Additionally or alternatively, the client computing device 104 may interpret raw sensor data to generate higher-level user presence data 244 indicating that the user is present.

The client computing device 104 may monitor for sensor data from the camera 154 and in some embodiments may detect the presence of the user by analyzing image data produced by the camera 154. The client computing device 104 may, for example, perform a facial recognition algorithm or other operation on the image data to detect the presence of the user. As another example, the client computing device 104 may monitor sensor data from other sensors 158, such as a proximity sensor or a biometric sensor. In some embodiments, the client computing device 104 may monitor location data from the location circuitry 156. For a client computing device 104 such as a mobile computing device or a wearable computing device that is commonly used near the user, the location of the client computing device 104 may correspond to the location of the user. Additionally or alternatively, in some embodiments the client computing device 104 may monitor for interaction data such as user input commands, data streaming commands, or other events indicating that the user is interacting with the client computing device 104.

In some embodiments, in block 404 the client computing device 104 may identify one or more distinct users based on the sensor data. For example, the client computing device 104 may analyze available biometric information to identify the users nearby the client computing device 104. In some embodiments, in block 406 the client computing device 104 may monitor the environment of the client computing device 104 for user presence data 244. For example, the client computing device 104 may monitor a microphone to detect the presence, location, and/or current context of the user. For example, the client computing device 104 may determine that the user is located in a vehicle based on detected engine noise. As another example, the client computing device 104 may use the microphone to detect music currently being played by the user. In some embodiments, the client computing device 104 may transmit a sample of the detected musing to the control server 102 to recognize what is played.

In block 408, the client computing device 104 sends the user presence data 244 to the control server 102. The user presence data 244 may be transmitted in any appropriate format. As described above, the client computing device 104 may transmit any combination of raw sensor data and processed, higher-level user presence data 244 to the control server 102.

In block 410, the client computing device 104 determines whether the client computing device 104 is currently streaming data from one or more data stream sources 106. For example, the client computing device 104 may determine whether an audio stream is currently being played. If not, the method 400 branches to block 424, described below. If the client computing device 104 is streaming data, the method 400 advances to block 412.

In block 412, the client computing device 104 streams data from the data stream source 106. The client computing device 104 may stream the data in any appropriate format, using any appropriate data transport. In some embodiments, in block 414 the client computing device 104 may adjust the data stream audio volume and/or balance to smoothly transition the data stream with another client computing device 104. For example, the client computing device 104 may adjust the volume to compensate for differences in the distance between the user and the client computing devices 104, differences between output level of the audio devices 150, and/or other factors affecting the user's perception of the data stream output.

In some embodiments, in block 416 the client computing device 104 may stream data from a forward cache rather than directly from a data stream source 106. The client computing device 104 may stream the data from a cache maintained by a remote computing device such as a forward cache 222 of the control server 102, a forward cache 254 of a different client computing device 104, or a cache maintained by some other device. In some embodiments, the client computing device 104 may maintain its own forward cache 254.

In some embodiments, in block 418 the client computing device 104 may send stream metadata to the control server 102. The stream metadata may include, for example, information about the identity or content of the data stream, information about the user interactions with the data stream (e.g., starting or stopping the stream, the current position in the stream, etc.), or other metadata. As described above, the control server 102 may use the stream metadata to determine when a user is present at the client computing device 104, to transition data streams between client computing devices 104, and for other purposes.

In block 420, the client computing device 104 monitors sensors to determine the user interest data 250 associated with the current data stream. The user interest data 250 indicates the user's level of interest in the data stream currently being output by the client computing device 104. For example, the user interest data 250 may indicate whether the user is interested in the song currently being streamed by the client computing device 104. In some embodiments, the client computing device 104 may receive image data from the camera 154. As another example, the client computing device 104 may receive sensor data from one or more of the sensors 158, such as a skin conductance sensor or a motion sensor.

In some embodiments, the client computing device 104 may determine the user's interest level by determining the user's arousal state. The user's arousal state may indicate interest in the current data stream. The client computing device 104 may, for example, examine image data for indications of the user's emotional state, such as the user's facial expression, motions, or heart rate. As another example, the client computing device 104 may determine the arousal state by analyzing skin conductance sensor data for anomalous signals indicating a change in nervous signaling. Changes in the skin conductance response may indicate the user's arousal state and thus the user's interest in the data stream.

Additionally or alternatively, in some embodiments the client computing device 104 may determine the user's gaze direction, which may indicate the user's interest in the data stream. For example, if interested in the data stream the user may look at the display 152 of the client computing device 104 in order to read information about the data stream such as title and/or artist information. The client computing device 104 may determine the gaze direction by examining image data received from the camera 154. Similarly, the client computing device 104 may determine that the user is viewing the display 152 based on motion sensor data, for example by determining that the user has raised the client computing device 104 into viewing position.

In block 422, the client computing device 104 sends the user interest data 250 to the control server 102. The user interest data 250 may be transmitted in any appropriate format. As described above, the client computing device 104 may transmit any combination of raw sensor data and processed, higher-level user interest data 250 to the control server 102.

In block 424, the client computing device 104 monitors for commands or other control messages to transition a data stream. The commands may indicate that the client computing device 104 should hand off a data stream to another client computing device 104 or that the client computing device 104 should take over streaming a data stream from another client computing device 104. The client computing device 104 may use any appropriate technique for monitoring for commands. In some embodiments, in block 426, the client computing device 104 may monitor for commands received from the control server 102. In some embodiments, in block 428, the client computing device 104 may monitor for commands received from other client computing devices 104.

In block 430, the client computing device 104 determines whether to transition the data stream. The client computing device 104 may transition the data stream, for example, in response to a command received as described above in connection with block 424. Additionally or alternatively, in some embodiments the client computing device 104 may determine to transition the data stream based on its own sensor input. For example, the client computing device 104 may start streaming data when the user's presence is detected and may stop streaming the data when the user's presence is no longer detected. If the client computing device 104 determines not to transition the data stream, the method 400 loops back to block 402 to continue monitoring for user presence data 244. If the client computing device 104 determines to transition the data stream, the method 400 advances to block 432.

In block 432, the client computing device 104 transitions the data stream to and/or from another client computing device 104. In some embodiments, in block 434 the client computing device 104 may start or stop the data stream based on metadata received in a command to transition the data stream. The metadata of the command to transition the data stream may, for example, identify the data stream source 106 associated with the data stream, the location in the data stream at which to begin playback, or other metadata. In some embodiments, in block 436 the client computing device 104 saves the data stream for later use. The client computing device 104 may, for example, record metadata associated with the data stream to allow the data stream to be restarted. The client computing device 104 may, for example, store the metadata in a "favorites" list or other storage location associated with the user. In some embodiments, in block 438, the client computing device 104 may present a user interface to allow the user to control the transition. For example, the client computing device 104 may present a control panel or other user interface to allow the user to start or stop playback of the data stream. In some embodiments, in block 440 the client computing device 104 may transfer the forward cache 254 to or from another client computing device 104. Thus, the client computing device 104 may support uninterrupted streaming by transferring the forward cache 254 to the new device. After transitioning the data stream, the method 400 loops back to block 402 to continue monitoring for user presence data 244.

To illustrate the operation of the system 100, in one potential illustrative embodiment, a user may begin by listening to music (e.g., a particular song) in his or her vehicle. The music may be streamed to a client computing device 104 that is embodied as an in-vehicle infotainment device. The system 100 may monitor sensors in the vehicle to determine the user's interest level in the song currently being streamed by the client computing device 104. For example, camera data may monitor the user's facial expressions and/or gaze to determine whether the user is interested in the current data stream. As another example, skin conductance sensors embedded in the seat, steering wheel, or other surfaces of the vehicle may be monitored to determine whether the user is interested in the current data stream.

To continue the illustration, the user may turn off the vehicle after reaching the user's house. The system 100 may determine that the user's mobile phone, which is a client computing device 104, is nearby the user. The system 100 may transition the data stream to the mobile phone. The mobile phone may, for example, immediately begin streaming the data stream and playing the current song. The system 100 may adjust the volume and/or balance of the audio produced by the mobile phone to provide for a smooth transition from the in-vehicle infotainment device. As another example, the mobile phone may store metadata related to the current song and/or cache the data stream to allow the user to restart the data stream at a later time.

Continuing the illustration, the user may walk from the vehicle into the user's house. After entering the house, the system 100 may detect that the user is present near a home audio receiver, which is also a client computing device 104. As described above, the system 100 may transition the data stream (e.g., the current song) from the mobile phone to the home audio receiver. Again, the system 100 may adjust the volume and/or balance of the audio produced by the home audio receiver to provide for a smooth transition from the mobile phone. Thus, the system 100 provides for a seamless data streaming experience using multiple client computing devices 104.

EXAMPLES

Illustrative examples of the technologies disclosed herein are provided below. An embodiment of the technologies may include any one or more, and any combination of, the examples described below.

Example 1 includes a computing device for a seamless data streaming experience, the computing device comprising a user presence module to receive user presence data from a plurality of remote computing devices, wherein the user presence data is indicative of whether a user is nearby each of the plurality of remote computing devices; a device register module to identify one or more available computing devices of the plurality of remote computing devices based on the user presence data in response to a determination that the user is nearby each of the available computing devices; and a device transition module to (i) select a target computing device of the available computing devices and (ii) cause a data stream to transition from a current computing device to the target computing device.

Example 2 includes the subject matter of Example 1, and wherein the user presence data indicative of whether the user is nearby each of the plurality of remote computing devices comprises user presence data indicative of whether the user is reachable by a corresponding data stream output device of each of the plurality of remote computing devices.

Example 3 includes the subject matter of any of Examples 1 and 2, and wherein the data stream comprises an audio stream; and the corresponding data stream output device of each of the plurality of remote computing devices comprises a corresponding audio output of each of the plurality of remote computing devices.

Example 4 includes the subject matter of any of Examples 1-3, and wherein to receive the user presence data from the plurality of remote computing devices comprises to receive corresponding sensor data from each of the plurality of remote computing devices.

Example 5 includes the subject matter of any of Examples 1-4, and wherein the corresponding sensor data comprises camera data, audio sensor data, or proximity sensor data.

Example 6 includes the subject matter of any of Examples 1-5, and wherein the corresponding sensor data comprises device location data.

Example 7 includes the subject matter of any of Examples 1-6, and wherein to select the target computing device of the available computing devices comprises to select the target computing device based on proximity of the target computing device to the user.

Example 8 includes the subject matter of any of Examples 1-7, and wherein to select the target computing device of the available computing devices comprises to select the target computing device based on a device attribute of the target computing device.

Example 9 includes the subject matter of any of Examples 1-8, and wherein to select the target computing device of the available computing devices comprises to select the target computing device based on a user preference associated with the user.

Example 10 includes the subject matter of any of Examples 1-9, and further including a user interest module to receive user interest data from the current computing device, wherein the user interest data is indicative of an interest level of the user in the data stream; and determine a user interest level as a function of the user interest data; wherein the device transition module is further to determine whether to cause the data stream to transition based on the user interest level; and wherein to cause the data stream to transition from the current computing device to the target computing device comprises to cause the data stream to transition from the current computing device to the target computing device in response to a determination to cause the data stream to transition based on the user interest level.

Example 11 includes the subject matter of any of Examples 1-10, and wherein the user interest data comprises sensor data.

Example 12 includes the subject matter of any of Examples 1-11, and wherein the sensor data comprises camera data, audio sensor data, or skin conductance sensor data.

Example 13 includes the subject matter of any of Examples 1-12, and wherein to determine whether to cause the data stream to transition based on the user interest level comprises to compare the user interest level to a threshold interest level.

Example 14 includes the subject matter of any of Examples 1-13, and further including a user detection module to identify a plurality of users based on the user presence data, wherein each of the plurality of users is nearby a corresponding available computing device of the available computing devices; and identify a primary user of the plurality of users.

Example 15 includes the subject matter of any of Examples 1-14, and wherein the user detection module is further to select the data stream based on a based on a user preference associated with the primary user of the plurality of users.

Example 16 includes the subject matter of any of Examples 1-15, and wherein the user detection module is further update a user context model based on the user interest level; and to identify the primary user comprises to identify the primary user based on the user context model.

Example 17 includes the subject matter of any of Examples 1-16, and wherein to identify the one or more available computing devices of the plurality of remote computing devices comprises to determine whether each of the available computing devices is active based on data stream metadata.

Example 18 includes the subject matter of any of Examples 1-17, and wherein to cause the data stream to transition from a current computing device to the target computing device comprises to adjust a data stream playback parameter to transition from the current computing device to the target computing device.

Example 19 includes the subject matter of any of Examples 1-18, and wherein to adjust the data stream playback parameter comprises to adjust a volume parameter or a balance parameter.

Example 20 includes the subject matter of any of Examples 1-19, and wherein to cause the data stream to transition from a current computing device to the target computing device comprises to communicate with the target computing device to cause the target computing device to initiate playing of the data stream.

Example 21 includes the subject matter of any of Examples 1-20, and wherein to cause the target computing device to initiate the playing of the data stream comprises to cause the target computing device to initiate the playing of the data stream based on the cessation of playing of the data stream by the current computing device.

Example 22 includes the subject matter of any of Examples 1-21, and wherein to cause the data stream to transition from a current computing device to the target computing device comprises to cache the data stream for use by the target computing device.

Example 23 includes a computing device for a seamless data streaming experience, the computing device comprising a user presence module to (i) receive user presence data from one or more sensors of the computing device, wherein the user presence data is indicative of whether a user is nearby the computing device and (ii) transmit the user presence data to a control server; a data stream module to receive a data stream from a data stream source; and a user interest module to (i) receive user interest data from one or more sensors of the computing device, wherein the user interest data is indicative of an interest level of the user in the data stream and (ii) transmit the user interest data to the control server.

Example 24 includes the subject matter of Example 23, and wherein to receive the user presence data comprises to receive user presence data from a camera, an audio sensor, or a proximity sensor of the computing device.

Example 25 includes the subject matter of any of Examples 23 and 24, and wherein to receive the user presence data comprises to receive device location data from a location device of the computing device.

Example 26 includes the subject matter of any of Examples 23-25, and wherein the user presence module is further to determine whether the user is nearby the computing device based on the user presence data.

Example 27 includes the subject matter of any of Examples 23-26, and wherein to determine whether the user is nearby the computing device comprises to determine whether the user is reachable by a data stream output device of the computing device.

Example 28 includes the subject matter of any of Examples 23-27, and wherein the user presence data comprises user presence data indicative of an environment of the computing device.

Example 29 includes the subject matter of any of Examples 23-28, and wherein to receive the user interest data comprises to receive user interest data from a camera, an audio sensor, or a skin conductance sensor of the computing device.

Example 30 includes the subject matter of any of Examples 23-29, and wherein the user interest module is further to determine the user interest level based on the user interest data.

Example 31 includes the subject matter of any of Examples 23-30, and wherein the data stream comprises an audio stream.

Example 32 includes the subject matter of any of Examples 23-31, and wherein the data stream module is further to adjust a volume parameter or a balance parameter of the audio stream based on a location of the user.

Example 33 includes the subject matter of any of Examples 23-32, and further including a user detection module to identify a plurality of users based on the user presence data, wherein each of the plurality of users is nearby the computing device.

Example 34 includes the subject matter of any of Examples 23-33, and wherein the data stream module is further to receive, from a control server, a command to transition the data stream; and transition the data stream in response to receipt of the command to transition the data stream.

Example 35 includes the subject matter of any of Examples 23-34, and wherein to receive the command to transition the data stream comprises to receive the command to transition the data stream from the control server.

Example 36 includes the subject matter of any of Examples 23-35, and wherein the command to transition the data stream identifies the data stream.

Example 37 includes the subject matter of any of Examples 23-36, and wherein to transition the data stream comprises to start the data stream or to stop the data stream.

Example 38 includes the subject matter of any of Examples 23-37, and wherein to transition the data stream comprises to record metadata associated with the data stream for later use.

Example 39 includes the subject matter of any of Examples 23-38, and wherein to transition the data stream comprises to present a user interface to control the data stream.

Example 40 includes the subject matter of any of Examples 23-39, and wherein to transition the data stream comprises to transfer a forward cache of the data stream to a second computing device.

Example 41 includes a method for a seamless data streaming experience, the method comprising receiving, by a computing device, user presence data from a plurality of remote computing devices, wherein the user presence data is indicative of whether a user is nearby each of the plurality of remote computing devices; identifying, by the computing device, one or more available computing devices of the plurality of remote computing devices based on the user presence data in response to determining that the user is nearby each of the available computing devices; selecting, by the computing device, a target computing device of the available computing devices; and causing, by the computing device, a data stream to transition from a current computing device to the target computing device.

Example 42 includes the subject matter of Example 41, and wherein the user presence data indicative of whether the user is nearby each of the plurality of remote computing devices comprises user presence data indicative of whether the user is reachable by a corresponding data stream output device of each of the plurality of remote computing devices.

Example 43 includes the subject matter of any of Examples 41 and 42, and wherein the data stream comprises an audio stream; and the corresponding data stream output device of each of the plurality of remote computing devices comprises a corresponding audio output of each of the plurality of remote computing devices.

Example 44 includes the subject matter of any of Examples 41-43, and wherein receiving the user presence data from the plurality of remote computing devices comprises receiving corresponding sensor data from each of the plurality of remote computing devices.

Example 45 includes the subject matter of any of Examples 41-44, and wherein receiving the corresponding sensor data comprises receiving camera data, audio sensor data, or proximity sensor data.

Example 46 includes the subject matter of any of Examples 41-45, and wherein receiving the corresponding sensor data comprises receiving device location data.

Example 47 includes the subject matter of any of Examples 41-46, and wherein selecting the target computing device of the available computing devices comprises selecting the target computing device based on proximity of the target computing device to the user.

Example 48 includes the subject matter of any of Examples 41-47, and wherein selecting the target computing device of the available computing devices comprises selecting the target computing device based on a device attribute of the target computing device.

Example 49 includes the subject matter of any of Examples 41-48, and wherein selecting the target computing device of the available computing devices comprises selecting the target computing device based on a user preference associated with the user.

Example 50 includes the subject matter of any of Examples 41-49, and further including receiving, by the computing device, user interest data from the current computing device, wherein the user interest data is indicative of an interest level of the user in the data stream; determining, by the computing device, a user interest level as a function of the user interest data; and determining, by the computing device, whether to cause the data stream to transition based on the user interest level; wherein causing the data stream to transition from the current computing device to the target computing device comprises causing the data stream to transition from the current computing device to the target computing device in response to determining to cause the data stream to transition based on the user interest level.

Example 51 includes the subject matter of any of Examples 41-50, and wherein receiving the user interest data comprises receiving sensor data from the current computing device.

Example 52 includes the subject matter of any of Examples 41-51, and wherein receiving the sensor data comprises receiving camera data, audio sensor data, or skin conductance sensor data.

Example 53 includes the subject matter of any of Examples 41-52, and wherein determining whether to cause the data stream to transition based on the user interest level comprises comparing the user interest level to a threshold interest level.

Example 54 includes the subject matter of any of Examples 41-53, and further including identifying, by the computing device, a plurality of users based on the user presence data, wherein each of the plurality of users is nearby a corresponding available computing device of the available computing devices; and identifying, by the computing device, a primary user of the plurality of users.

Example 55 includes the subject matter of any of Examples 41-54, and further including selecting, by the computing device, the data stream based on a based on a user preference associated with the primary user of the plurality of users.

Example 56 includes the subject matter of any of Examples 41-55, and further including updating, by the computing device, a user context model based on the user interest level; wherein identifying the primary user comprises identifying the primary user based on the user context model.

Example 57 includes the subject matter of any of Examples 41-56, and wherein identifying the one or more available computing devices of the plurality of remote computing devices comprises determining whether each of the available computing devices is active based on data stream metadata.

Example 58 includes the subject matter of any of Examples 41-57, and wherein causing the data stream to transition from a current computing device to the target computing device comprises adjusting a data stream playback parameter to transition from the current computing device to the target computing device.

Example 59 includes the subject matter of any of Examples 41-58, and wherein adjusting the data stream playback parameter comprises adjusting a volume parameter or a balance parameter.

Example 60 includes the subject matter of any of Examples 41-59, and wherein causing the data stream to transition from a current computing device to the target computing device comprises communicating with the target computing device to cause the target computing device to initiate playing the data stream.

Example 61 includes the subject matter of any of Examples 41-60, and wherein causing the target computing device to initiate playing the data stream comprises causing the target computing device to initiate playing the data stream based on the cessation of playing the data stream by the current computing device.

Example 62 includes the subject matter of any of Examples 41-61, and wherein causing the data stream to transition from a current computing device to the target computing device comprises caching the data stream for use by the target computing device.

Example 63 includes a method for a seamless data streaming experience, the method comprising receiving, by a computing device, user presence data from one or more sensors of the computing device, wherein the user presence data is indicative of whether a user is nearby the computing device; transmitting, by the computing device, the user presence data to a control server; receiving, by the computing device, a data stream from a data stream source; receiving, by the computing device, user interest data from one or more sensors of the computing device, wherein the user interest data is indicative of an interest level of the user in the data stream; and transmitting, by the computing device, the user interest data to the control server.

Example 64 includes the subject matter of Example 63, and wherein receiving the user presence data comprises receiving user presence data from a camera, an audio sensor, or a proximity sensor of the computing device.

Example 65 includes the subject matter of any of Examples 63 and 64, and wherein receiving the user presence data comprises receiving device location data from a location device of the computing device.

Example 66 includes the subject matter of any of Examples 63-65, and further including determining, by the computing device, whether the user is nearby the computing device based on the user presence data.

Example 67 includes the subject matter of any of Examples 63-66, and wherein determining whether the user is nearby the computing device comprises determining whether the user is reachable by a data stream output device of the computing device.

Example 68 includes the subject matter of any of Examples 63-67, and wherein receiving the user presence data comprises receiving user presence data indicative of an environment of the computing device.

Example 69 includes the subject matter of any of Examples 63-68, and wherein receiving the user interest data comprises receiving user interest data from a camera, an audio sensor, or a skin conductance sensor of the computing device.

Example 70 includes the subject matter of any of Examples 63-69, and further including determining, by the computing device, the user interest level based on the user interest data.

Example 71 includes the subject matter of any of Examples 63-70, and wherein receiving the data stream comprises receiving an audio stream from the data stream source.

Example 72 includes the subject matter of any of Examples 63-71, and further including adjusting, by the computing device, a volume parameter or a balance parameter of the audio stream based on a location of the user.

Example 73 includes the subject matter of any of Examples 63-72, and further including identifying, by the computing device, a plurality of users based on the user presence data, wherein each of the plurality of users is nearby the computing device.

Example 74 includes the subject matter of any of Examples 63-73, and further including receiving, by the computing device from a control server, a command to transition the data stream; and transitioning, by the computing device, the data stream in response to receiving the command to transition the data stream.

Example 75 includes the subject matter of any of Examples 63-74, and wherein receiving the command to transition the data stream comprises receiving the command to transition the data stream from the control server.

Example 76 includes the subject matter of any of Examples 63-75, and wherein receiving the command to transition the data stream comprises receiving a command to transition the data stream that identifies the data stream.

Example 77 includes the subject matter of any of Examples 63-76, and wherein transitioning the data stream comprises starting the data stream or stopping the data stream.

Example 78 includes the subject matter of any of Examples 63-77, and wherein transitioning the data stream comprises recording metadata associated with the data stream for later use.

Example 79 includes the subject matter of any of Examples 63-78, and wherein transitioning the data stream comprises presenting a user interface to control the data stream.

Example 80 includes the subject matter of any of Examples 63-79, and wherein transitioning the data stream comprises transferring a forward cache of the data stream to a second computing device.

Example 81 includes a computing device comprising a processor; and a memory having stored therein a plurality of instructions that when executed by the processor cause the computing device to perform the method of any of Examples 41-80.

Example 82 includes one or more machine readable storage media comprising a plurality of instructions stored thereon that in response to being executed result in a computing device performing the method of any of Examples 41-80.

Example 83 includes a computing device comprising means for performing the method of any of Examples 41-80.

Example 84 includes a computing device for a seamless data streaming experience, the computing device comprising means for receiving user presence data from a plurality of remote computing devices, wherein the user presence data is indicative of whether a user is nearby each of the plurality of remote computing devices; means for identifying one or more available computing devices of the plurality of remote computing devices based on the user presence data in response to determining that the user is nearby each of the available computing devices; means for selecting a target computing device of the available computing devices; and means for causing a data stream to transition from a current computing device to the target computing device.

Example 85 includes the subject matter of Example 84, and wherein the user presence data indicative of whether the user is nearby each of the plurality of remote computing devices comprises user presence data indicative of whether the user is reachable by a corresponding data stream output device of each of the plurality of remote computing devices.

Example 86 includes the subject matter of any of Examples 84 and 85, and wherein the data stream comprises an audio stream; and the corresponding data stream output device of each of the plurality of remote computing devices comprises a corresponding audio output of each of the plurality of remote computing devices.

Example 87 includes the subject matter of any of Examples 84-86, and wherein the means for receiving the user presence data from the plurality of remote computing devices comprises means for receiving corresponding sensor data from each of the plurality of remote computing devices.

Example 88 includes the subject matter of any of Examples 84-87, and wherein the means for receiving the corresponding sensor data comprises means for receiving camera data, audio sensor data, or proximity sensor data.

Example 89 includes the subject matter of any of Examples 84-88, and wherein the means for receiving the corresponding sensor data comprises means for receiving device location data.

Example 90 includes the subject matter of any of Examples 84-89, and wherein the means for selecting the target computing device of the available computing devices comprises means for selecting the target computing device based on proximity of the target computing device to the user.

Example 91 includes the subject matter of any of Examples 84-90, and wherein the means for selecting the target computing device of the available computing devices comprises means for selecting the target computing device based on a device attribute of the target computing device.

Example 92 includes the subject matter of any of Examples 84-91, and wherein the means for selecting the target computing device of the available computing devices comprises means for selecting the target computing device based on a user preference associated with the user.

Example 93 includes the subject matter of any of Examples 84-92, and further including means for receiving user interest data from the current computing device, wherein the user interest data is indicative of an interest level of the user in the data stream; means for determining a user interest level as a function of the user interest data; and means for determining whether to cause the data stream to transition based on the user interest level; wherein the means for causing the data stream to transition from the current computing device to the target computing device comprises means for causing the data stream to transition from the current computing device to the target computing device in response to determining to cause the data stream to transition based on the user interest level.

Example 94 includes the subject matter of any of Examples 84-93, and wherein the means for receiving the user interest data comprises means for receiving sensor data from the current computing device.

Example 95 includes the subject matter of any of Examples 84-94, and wherein the means for receiving the sensor data comprises means for receiving camera data, audio sensor data, or skin conductance sensor data.

Example 96 includes the subject matter of any of Examples 84-95, and wherein the means for determining whether to cause the data stream to transition based on the user interest level comprises means for comparing the user interest level to a threshold interest level.

Example 97 includes the subject matter of any of Examples 84-96, and further including means for identifying a plurality of users based on the user presence data, wherein each of the plurality of users is nearby a corresponding available computing device of the available computing devices; and means for identifying a primary user of the plurality of users.

Example 98 includes the subject matter of any of Examples 84-97, and further including means for selecting the data stream based on a based on a user preference associated with the primary user of the plurality of users.

Example 99 includes the subject matter of any of Examples 84-98, and further including means for updating a user context model based on the user interest level; wherein the means for identifying the primary user comprises means for identifying the primary user based on the user context model.

Example 100 includes the subject matter of any of Examples 84-99, and wherein the means for identifying the one or more available computing devices of the plurality of remote computing devices comprises means for determining whether each of the available computing devices is active based on data stream metadata.

Example 101 includes the subject matter of any of Examples 84-100, and wherein the means for causing the data stream to transition from a current computing device to the target computing device comprises means for adjusting a data stream playback parameter to transition from the current computing device to the target computing device.

Example 102 includes the subject matter of any of Examples 84-101, and wherein the means for adjusting the data stream playback parameter comprises means for adjusting a volume parameter or a balance parameter.

Example 103 includes the subject matter of any of Examples 84-102, and wherein the means for causing the data stream to transition from a current computing device to the target computing device comprises means for communicating with the target computing device to cause the target computing device to initiate playing the data stream.

Example 104 includes the subject matter of any of Examples 84-103, and wherein the means for causing the target computing device to initiate playing the data stream comprises means for causing the target computing device to initiate playing the data stream based on the cessation of playing the data stream by the current computing device.

Example 105 includes the subject matter of any of Examples 84-104, and wherein the means for causing the data stream to transition from a current computing device to the target computing device comprises means for caching the data stream for use by the target computing device.

Example 106 includes a computing device for a seamless data streaming experience, the computing device comprising means for receiving user presence data from one or more sensors of the computing device, wherein the user presence data is indicative of whether a user is nearby the computing device; means for transmitting the user presence data to a control server; means for receiving a data stream from a data stream source; means for receiving user interest data from one or more sensors of the computing device, wherein the user interest data is indicative of an interest level of the user in the data stream; and means for transmitting the user interest data to the control server.

Example 107 includes the subject matter of Example 106, and wherein the means for receiving the user presence data comprises means for receiving user presence data from a camera, an audio sensor, or a proximity sensor of the computing device.

Example 108 includes the subject matter of any of Examples 106 and 107, and wherein the means for receiving the user presence data comprises means for receiving device location data from a location device of the computing device.

Example 109 includes the subject matter of any of Examples 106-108, and further including means for determining whether the user is nearby the computing device based on the user presence data.

Example 110 includes the subject matter of any of Examples 106-109, and wherein the means for determining whether the user is nearby the computing device comprises means for determining whether the user is reachable by a data stream output device of the computing device Example 111 includes the subject matter of any of Examples 106-110, and wherein the means for receiving the user presence data comprises means for receiving user presence data indicative of an environment of the computing device.

Example 112 includes the subject matter of any of Examples 106-111, and wherein the means for receiving the user interest data comprises means for receiving user interest data from a camera, an audio sensor, or a skin conductance sensor of the computing device.

Example 113 includes the subject matter of any of Examples 106-112, and further including means for determining the user interest level based on the user interest data.

Example 114 includes the subject matter of any of Examples 106-113, and wherein the means for receiving the data stream comprises means for receiving an audio stream from the data stream source.

Example 115 includes the subject matter of any of Examples 106-114, and further including means for adjusting a volume parameter or a balance parameter of the audio stream based on a location of the user.

Example 116 includes the subject matter of any of Examples 106-115, and further including means for identifying a plurality of users based on the user presence data, wherein each of the plurality of users is nearby the computing device.

Example 117 includes the subject matter of any of Examples 106-116, and further including means for receiving, from a control server, a command to transition the data stream; and means for transitioning the data stream in response to receiving the command to transition the data stream.

Example 118 includes the subject matter of any of Examples 106-117, and wherein the means for receiving the command to transition the data stream comprises means for receiving the command to transition the data stream from the control server.

Example 119 includes the subject matter of any of Examples 106-118, and wherein the means for receiving the command to transition the data stream comprises means for receiving a command to transition the data stream that identifies the data stream.

Example 120 includes the subject matter of any of Examples 106-119, and wherein the means for transitioning the data stream comprises means for starting the data stream or stopping the data stream.

Example 121 includes the subject matter of any of Examples 106-120, and wherein the means for transitioning the data stream comprises means for recording metadata associated with the data stream for later use.

Example 122 includes the subject matter of any of Examples 106-121, and wherein the means for transitioning the data stream comprises means for presenting a user interface to control the data stream.

Example 123 includes the subject matter of any of Examples 106-122, and wherein the means for transitioning the data stream comprises means for transferring a forward cache of the data stream to a second computing device.

The invention claimed is:

1. A computing device for a seamless data streaming experience, the computing device comprising:
   a user presence module to receive user presence data from a plurality of remote computing devices, wherein the user presence data comprises camera sensor data, audio sensor data, or biometric sensor data indicative of whether a user is nearby each of the plurality of remote computing devices;
   a device register module to identify one or more available computing devices of the plurality of remote computing devices based on the user presence data in response to a determination that the user is nearby each of the available computing devices;
   a user interest module to (i) receive user interest data from a current computing device, wherein the user interest data is indicative of an interest level of the user in a data stream played by the current computing device and (ii) determine a user interest level as a function of the user interest data;

a user detection module to (i) identify a plurality of users based on the user presence data, wherein each of the plurality of users is nearby a corresponding available computing device of the available computing devices, (ii) update a user context model based on the user interest level, and (iii) identify a primary user of the plurality of users based on the user context model; and a device transition module to (i) select a target computing device of the available computing devices, (ii) determine whether to cause the data stream to transition based on a comparison of the user interest level and a threshold interest level, and (iii) cause the data stream to transition from the current computing device to the target computing device in response to a determination to cause the data stream to transition based on a comparison of the user interest level and the threshold interest level, wherein to cause the data stream to transition comprises to adjust audio volume of the data stream to transition from the current computing device to the target computing device, to cause the current computing device to stop playing of the data stream, and to cause the target computing device to initiate playing of the data stream for output to the user, and wherein to adjust the audio volume of the data stream comprises to adjust the audio volume of the data stream as a function of a distance between the user and the current computing device and a distance between the user and the target computing device.

2. The computing device of claim 1, wherein to select the target computing device of the available computing devices comprises to select the target computing device based on proximity of the target computing device to the user.

3. The computing device of claim 1, wherein:
to receive the user interest data from the current computing device comprises to receive sensor data indicative of the interest level of the user in the data stream, wherein the sensor data comprises camera data, audio sensor data, or skin conductance sensor data.

4. The computing device of claim 1, wherein to cause the data stream to transition from a current computing device to the target computing device comprises to communicate with the target computing device to cause the target computing device to initiate playing of the data stream.

5. One or more non-transitory computer-readable storage media comprising a plurality of instructions that in response to being executed cause a computing device to:
receive user presence data from a plurality of remote computing devices, wherein the user presence data comprises camera sensor data, audio sensor data, or biometric sensor data indicative of whether a user is nearby each of the plurality of remote computing devices;
identify one or more available computing devices of the plurality of remote computing devices based on the user presence data in response to determining that the user is nearby each of the available computing devices;
receive user interest data from a current computing device, wherein the user interest data is indicative of an interest level of the user in a data stream played by the current computing device;
determine a user interest level as a function of the user interest data;
identify a plurality of users based on the user presence data, wherein each of the plurality of users is nearby a corresponding available computing device of the available computing devices;
update a user context model based on the user interest level;
identify a primary user of the plurality of users based on the user context model;
select a target computing device of the available computing devices;
determine whether to cause the data stream to transition based on comparing the user interest level and a threshold interest level; and
cause the data stream to transition from the current computing device to the target computing device in response to determining to cause the data stream to transition based on comparing the user interest level and the threshold interest level, wherein to cause the data stream to transition comprises to adjust audio volume of the data stream to transition from the current computing device to the target computing device, to cause the current computing device to stop playing the data stream, and to cause the target computing device to initiate playing the data stream for output to the user, and wherein to adjust the audio volume of the data stream comprises to adjust the audio volume of the data stream as a function of a distance between the user and the current computing device and a distance between the user and the target computing device.

6. The one or more non-transitory computer-readable storage media of claim 5, wherein to select the target computing device of the available computing devices comprises to select the target computing device based on proximity of the target computing device to the user.

7. The one or more non-transitory computer-readable storage media of claim 5, wherein:
to receive the user interest data from the current computing device comprises to receive sensor data indicative of the interest level of the user in the data stream, wherein the sensor data comprises camera data, audio sensor data, or skin conductance sensor data.

8. The one or more non-transitory computer-readable storage media of claim 5, wherein to cause the data stream to transition from a current computing device to the target computing device comprises to communicate with the target computing device to cause the target computing device to initiate playing the data stream.

* * * * *